Dec. 31, 1957    M. C. CORNS    2,818,291
UTENSIL HANDLE-CHANGING DEVICE
Filed June 27, 1956
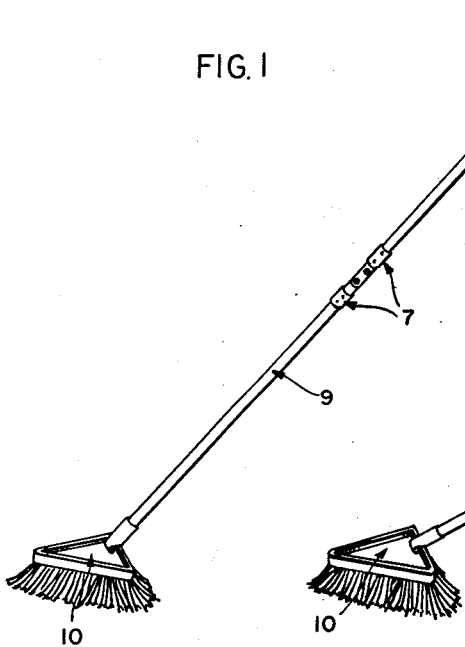
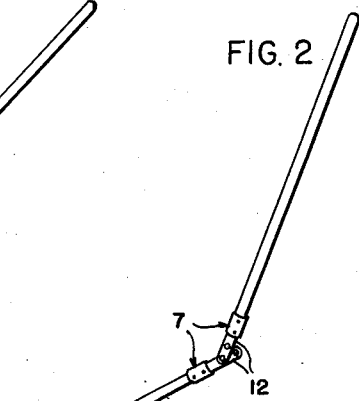
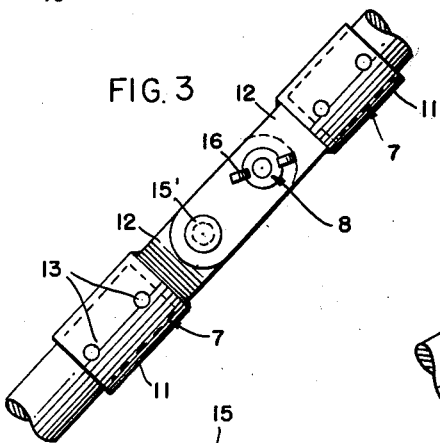
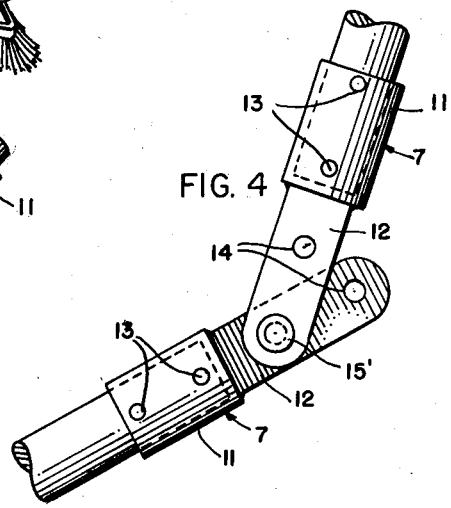
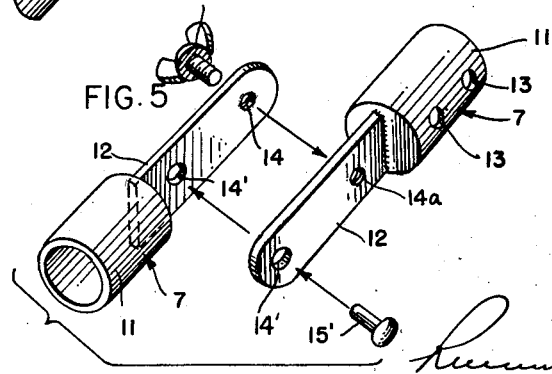
*INVENTOR:*
MARSHALL CORNS
BY
ATT'YS

United States Patent Office 2,818,291
Patented Dec. 31, 1957

2,818,291
UTENSIL HANDLE-CHANGING DEVICE
Marshall C. Corns, Evanston, Ill.
Application June 27, 1956, Serial No. 594,279
2 Claims. (Cl. 287—99)

This invention relates to a handle-changing device which permits quickly changing the handle of a floor-treating utensil from a rigid to a flexible condition to permit more convenient reaching under furniture of various kinds.

Where dusting, cleaning, or polishing of floors has to be done under furniture, and the operating handle of the utensil for that purpose is long and rigid, it requires the operator to bend over and/or stoop down in order to reach under large pieces of furniture close to the floor.

The main objects of this invention are to provide an improved device for rendering a utensil handle either rigid or flexible at will; to provide an improved handle-changing device of this kind which permits a quick conversion of the conventional one-piece utensil handle into a two-piece handle capable of being readily reversed from rigid to flexible condition as circumstances require; and to provide an improved handle-changing device of this kind which is of very simple construction, hence economical to manufacture and convenient for selling to do-it-yourself purchasers to easily convert various utensil handles to a status that allows for quick reversal between rigid and flexible conditions.

An illustrative embodiment of this invention is shown in the accompanying drawings, in which:

Figure 1 is a perspective view of a floor-treating utensil, the handle of which is equipped with an improved handle-changing device constructed in accordance with this invention, the handle being shown in its rigid condition.

Fig. 2 is a similar view but showing the handle in its flexible condition.

Fig. 3 is an enlarged view of this improved handle-changing device as used for maintaining the handle rigid.

Fig. 4 is a similar view but showing the device as used for maintaining the handle flexible; and Fig. 5 is an exploded perspective of this improved handle-changing device.

The essential concept of this invention involves a pair of identical elements each comprising integral socket and apertured stem parts, the socket parts seating the ends of handle sections and the stem parts being hingedly or rigidly secured together in overlapping relationship by two fasteners, one a headed machine screw and the other a rivet.

A handle-changing device embodying the foregoing concept comprises a pair of elements 7 securable in hinged or rigid relationship by a fastener 8 and especially suitable for use with a handle 9 for a floor-treating utensil 10.

The elements 7 are identical units each including a socket part 11 and a stem part 12. The socket part 12 is of cylindrical form and adapted to seat one end of a section of the handle 9. One or two small holes 13 are formed in the socket part 11 so that the handle section may be secured against displacement from the socket part 11, by brads driven through the holes 13 into the handle.

The stem part 12 is flat, slightly longer than the socket part 11, and is disposed axially centrally of the respective socket part 11. Pairs of aligned apertures 14, 14a and 14' are formed in each of the stem part 12 adjacent the ends thereof. Each of the apertures 14 are internally threaded.

The fastener 8 is a conventional machine screw 15 with a wing nut 16 on its head which is threaded in the aligned apertures 14 and 14a while a loose rivet pivot 15' is inserted in the aligned apertures 14' to secure the two stems 12 together in pivotal arrangement.

This device is designed to be manufactured as an accessory to be sold through hardware and utility stores, and the like, for do-it-yourself use in converting rigid one-piece wood handles into two sections for almost any kind of a utensil, and especially floor-treating utensils, such as mops, floor polishers, and the like.

Upon obtaining one of these devices, the purchaser has but to cut the conventional one-piece handle into two sections and press the end of each section into one of the socket parts 11. If the handle section is a bit too large to easily press into the socket, it may be sanded or cut down slightly to facilitate such a press insertion. Small brads may then be driven through the holes 13 to insure retention of the handle in the socket part 11.

Once the two elements 7 have been secured to the ends of the two handle sections, the bolt 15 may be threaded in internally threaded registering apertures 14 and 14a in the overlapping stem parts 12, and tightened by the wing nut head 16. This provides a rigid handle.

If, on the other hand, a flexible handle 9, as shown in Fig. 2, is desired screw 15 is removed from aperture 14a only in the overlapping stem part 12 whereby the stem 12 will pivot about the rivet 15'. It is to be understood that the screw 15 is not removed from threaded engagement with the aperture 14.

It should be obvious that a bolt or other suitable fastener may be substituted for the rivet pivot 15.

Although but one specific embodiment of this invention is herein shown and described, it will be understood that numerous details of the construction shown may be altered or omitted without departing from the spirit of the invention as defined by the following claims.

I claim:

1. A handle-changing device comprising, a pair of identical members each formed with a socket and an integral, flat, plain-surface, axially-disposed part, each of said parts having a pair of apertures spaced along the longitudinal median of the respective parts whereby the two apertures in each part are disposed in registering relationship when the two parts are superimposed, a fastener inserted through one pair of registering apertures to secue the parts together in pivotal relationship to permit varied manual angulation of the sockets, and a second fastener insertable through the other pair of registering apertures to secure the parts in non-pivotal relationship with the sockets in fixed axial alignment.

2. A handle-changing device comprising, a pair of identical members each formed with a socket and an integral, flat plain-surface, axially-disposed part, each of said parts having a pair of apertures spaced along the longitudinal median of the respective parts whereby the two apertures in each part are disposed in registering relationship when the two parts are superimposed, one of the apertures of one of the parts being internally threaded, a rivet fastener inserted through the non-threaded registering apertures to secure the parts together in non-separable pivotal relationship to permit varied manual angulation of the sockets, and a threaded fastener insertable through the pair of apertures including the threaded one to secure the parts in non-pivotal relationship with the sockets in fixed axial alignment.

References Cited in the file of this patent

UNITED STATES PATENTS

| | | |
|---|---|---|
| 1,461,813 | Wood | July 17, 1923 |
| 1,501,605 | Lane | July 15, 1924 |
| 2,286,655 | Supnick | June 16, 1942 |
| 2,555,226 | Draughn | May 29, 1951 |
| 2,750,616 | Klugmann | June 19, 1956 |
| 2,738,999 | Olson | Mar. 20, 1956 |